United States Patent
Yokoyama et al.

(10) Patent No.: US 8,843,052 B2
(45) Date of Patent: Sep. 23, 2014

(54) SLIDE RAIL, AND SHEET FEEDER AND IMAGE FORMING APPARATUS INCLUDING SAME

(71) Applicants: Toshiki Yokoyama, Kanagawa (JP); Yasutomo Ide, Kanagawa (JP); Yasuhiro Kuba, Kanagawa (JP); Tsuyoshi Hashiyada, Kanagawa (JP); Kouhei Okamoto, Kanagawa (JP)

(72) Inventors: Toshiki Yokoyama, Kanagawa (JP); Yasutomo Ide, Kanagawa (JP); Yasuhiro Kuba, Kanagawa (JP); Tsuyoshi Hashiyada, Kanagawa (JP); Kouhei Okamoto, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 129 days.

(21) Appl. No.: 13/674,362

(22) Filed: Nov. 12, 2012

(65) Prior Publication Data

US 2013/0156476 A1 Jun. 20, 2013

(30) Foreign Application Priority Data

Dec. 20, 2011 (JP) ................ 2011-277811

(51) Int. Cl.
| | |
|---|---|
| B65H 1/00 | (2006.01) |
| G03G 21/00 | (2006.01) |
| A47B 88/00 | (2006.01) |
| G03G 15/00 | (2006.01) |
| F16C 29/04 | (2006.01) |
| B65H 1/04 | (2006.01) |
| B65H 1/26 | (2006.01) |
| A47B 88/14 | (2006.01) |
| G03G 21/16 | (2006.01) |

(52) U.S. Cl.
CPC ............ *F16C 29/04* (2013.01); *G03G 15/6529* (2013.01); *B65H 2402/32* (2013.01); *B65H 1/04* (2013.01); *B65H 1/266* (2013.01); *A47B 2210/0045* (2013.01); *A47B 88/14* (2013.01); *G03G 15/6502* (2013.01); *A47B 2210/0059* (2013.01); *G03G 21/1623* (2013.01); *F16C 29/045* (2013.01)
USPC ......................... 399/393; 271/145; 312/334.8

(58) Field of Classification Search
CPC ......... G03G 15/00; G03G 21/00; A47B 88/00
USPC ........................................................ 399/393
See application file for complete search history.

(56) References Cited

U.S. PATENT DOCUMENTS

| | | | | |
|---|---|---|---|---|
| 2,873,150 | A | * | 2/1959 | Hutzelman .................... 384/19 |
| 4,564,248 | A | * | 1/1986 | Grass .............................. 384/19 |

(Continued)

FOREIGN PATENT DOCUMENTS

| | | | | |
|---|---|---|---|---|
| CH | 668539 | A | * | 1/1989 |
| GB | 1290751 | | * | 9/1972 ............. A47B 88/08 |

(Continued)

*Primary Examiner* — Nguyen Ha
(74) *Attorney, Agent, or Firm* — Harness, Dickey & Pierce, P.L.C.

(57) ABSTRACT

A slide rail includes an outer rail including a first rail board and a pair of rims projecting from the first rail board, forming first grooves, an inner rail inserted between the first grooves and including a second rail board narrower than the first rail board and a pair of rims projecting from the second rail board, forming second grooves, a large-diameter roller held between the first grooves and attached to a leading side of the second rail board in a direction in which the inner rail is inserted, and a small-diameter roller held between the second grooves and attached to a leading side of the first rail board in a direction in which the inner rail is drawn out. The first and second rail boards include protruding portions extending along the long side and protruding outward.

8 Claims, 8 Drawing Sheets

(56) References Cited

U.S. PATENT DOCUMENTS

| | | | | |
|---|---|---|---|---|
| 4,927,216 A | * | 5/1990 | Boda | 312/334.12 |
| 4,944,605 A | * | 7/1990 | Shen | 384/19 |
| 5,015,048 A | * | 5/1991 | Brunnert | 312/319.1 |
| 5,076,712 A | * | 12/1991 | Salice | 384/19 |
| 5,893,619 A | * | 4/1999 | Nachbaur | 312/334.44 |
| 2002/0033657 A1 | * | 3/2002 | Kim et al. | 312/334.12 |
| 2004/0207302 A1 | * | 10/2004 | Kao | 312/348.1 |
| 2010/0123378 A1 | * | 5/2010 | Chen et al. | 312/333 |
| 2011/0037362 A1 | * | 2/2011 | Park et al. | 312/319.1 |

FOREIGN PATENT DOCUMENTS

| | | | | |
|---|---|---|---|---|
| GB | 1335776 | * 11/1972 | | A47B 88/10 |
| JP | 54-046660 | 4/1979 | | |
| JP | 06245830 A | * 9/1994 | | A47B 88/04 |
| JP | 06245831 A | * 9/1994 | | A47B 88/04 |
| JP | 11-285416 | 10/1999 | | |
| JP | 2001-173305 | 6/2001 | | |
| JP | 2010269113 A | * 12/2010 | | A47B 88/04 |
| JP | 2011159716 A | * 8/2011 | | A47B 88/10 |
| WO | WO 2012002041 A1 | * 1/2012 | | A47B 88/10 |

* cited by examiner

SLIDE RAIL, AND SHEET FEEDER AND IMAGE FORMING APPARATUS INCLUDING SAME

CROSS-REFERENCE TO RELATED APPLICATION

This patent application is based on and claims priority pursuant to 35 U.S.C. §119 to Japanese Patent Application No. 2011-277811, filed on Dec. 20, 2011, in the Japan Patent Office, the entire disclosure of which is hereby incorporated by reference herein.

BACKGROUND OF THE INVENTION

1. Field of the Invention

The present invention generally relates to a slide rail; and a sheet feeder and an image forming apparatus, such as a copier, a printer, a facsimile machine, or a multifunction machine including at least two of these functions, that includes a slide rail.

2. Description of the Related Art

Typically, drawers incorporated in furniture, office equipment, copiers, and the like, are pulled out therefrom and pushed therein using slide rails, and rolling elements such as ball bearings can be used to make sliding movements smooth. Additionally, cylindrical rollers are widely used instead of rolling elements to reduce costs and simplify processing and assembling of the slide rail.

For example, JP-2001-173305-A proposes a slide rail in which an inner rail mounted to an outer rail can be inserted therein and drawn out therefrom. In this configuration, an end rim of the inner rail is held between rollers attached to a protruding portion of the outer rail, and a roller attached to a tapered end of the inner rail is held between rims of the outer rail.

In slide rails using rollers, generally a lateral load of the roller is received by a small area of the slide rail. Accordingly, it is possible that the slide rail in contact with the roller is deformed elastically or plastically by lateral load, and the roller is disengaged therefrom. Additionally, movement of slide rails employing rollers tend to be less smooth compared with slide rails employing rolling elements.

SUMMARY OF THE INVENTION

In view of the foregoing, one embodiment of the present invention provides a slide rail that includes an outer rail, an inner rail, a large-diameter roller, and a small-diameter roller. The outer rail includes a first rail board and a pair of rims projecting from long sides of the first rail board, forming a pair of first grooves on an inner side of the first rail board. Opening sides of the first grooves face each other. The inner rail is inserted between the first grooves of the first rail board to be drawn out from the first rail board. The inner rail includes a second rail board shorter than the first rail board in a width direction perpendicular to the long side thereof, and a pair of rims projecting from long sides of the second rail board, forming a pair of second grooves on an inner side of the second rail board. Opening sides of the second grooves face each other. The large-diameter roller is held between the first grooves of the outer rail, and is attached to a leading side of the second rail board in a direction in which the inner rail is inserted into the first grooves of the outer rail. The small-diameter roller is held between the second grooves of the inner rail, and attached to a leading side of the first rail board in a direction in which the inner rail is drawn out from the first grooves of the outer rail. The first rail board includes a protruding portion extending along the long side thereof and protruding to an outer side opposite the inner side of the first rail board on which the large-diameter roller is disposed, and the second rail board includes a protruding portion extending along the long side thereof and protruding to an outer side opposite the inner side of the second rail board on which the small-diameter roller is disposed.

Another embodiment provides a sheet feeder that includes the above-described slide rail and a sheet tray for containing sheets of recording media. The sheet tray is mounted slidably between a retracted position and a drawn-out position.

Yet another embodiment provides an image forming apparatus that includes an image forming unit for forming images on sheets of recording media and the above-described sheet feeder.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Figure 1:
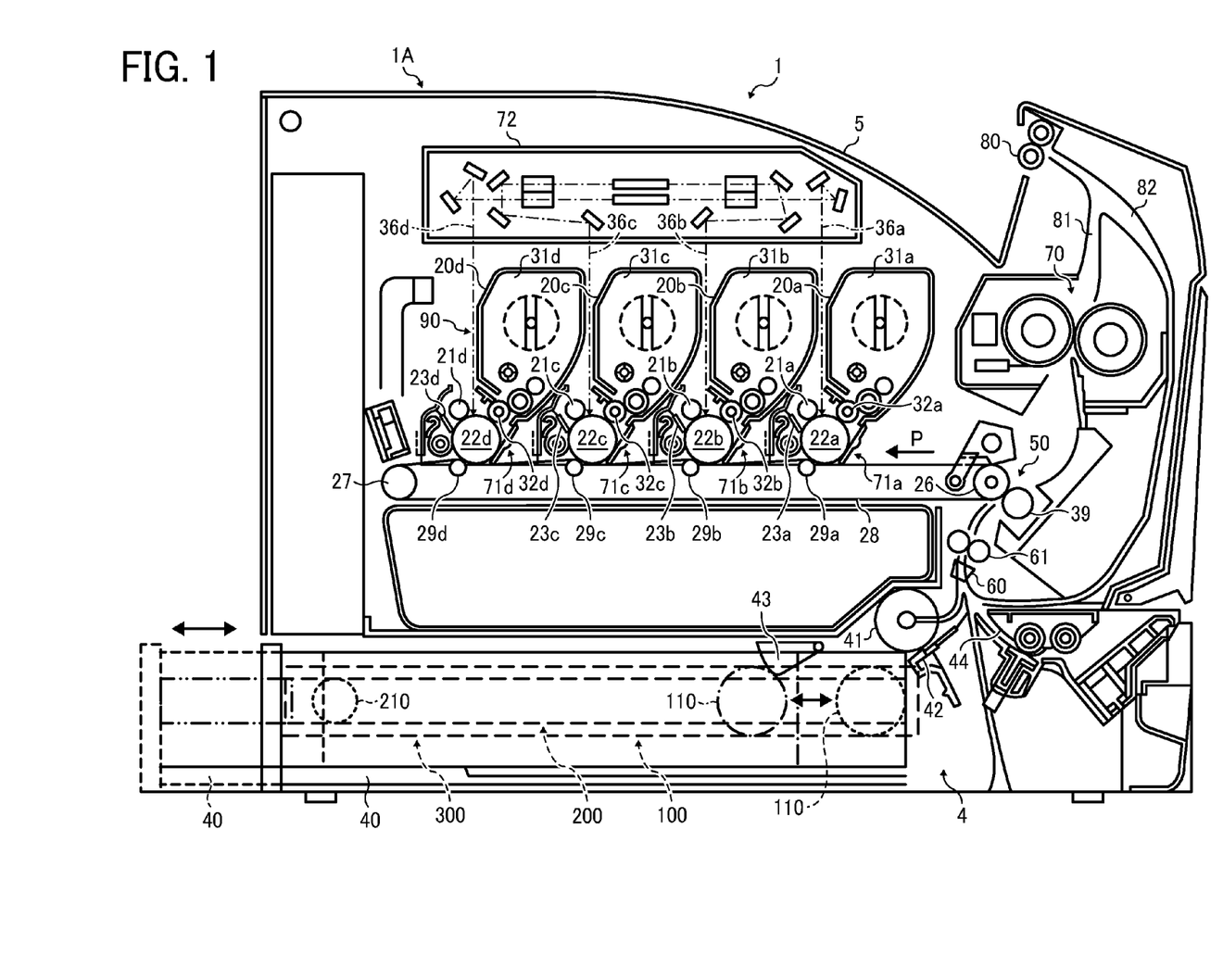
FIG. 1 is a schematic cross-sectional view of an image forming apparatus according to an embodiment of the present invention.

Referring now to the drawings, wherein like reference numerals designate identical or corresponding parts throughout the several views thereof, and particularly to FIG. 1, a multicolor image forming apparatus according to an embodiment of the present invention is described.

It is to be noted that the suffixes a, b, c, and d attached to each reference numeral given to image forming elements indicate only that components indicated thereby are used for forming cyan, magenta, yellow, or black images, and hereinafter may be omitted when color discrimination is not necessary.

First Embodiment

FIG. 1 is a schematic cross-sectional view of an image forming apparatus 1 according to an embodiment of the present invention. The image forming apparatus 1 shown in FIG. 1 includes an apparatus body 1A, a sheet feeder 4, and a pair of slide rails 300 provided between the apparatus body 1A so that a sheet tray 40 of the sheet feeder 4 is slidable relative to the apparatus body 1A.

A configuration of the image forming apparatus 1 is described below.

The image forming apparatus 1 in the present embodiment can be an electrophotographic multicolor printer capable of printing in cyan (C), magenta (M), yellow (Y), and black (Bk), for example. The image forming apparatus 1 includes a tandem image forming unit 90 in which image forming units 71a, 71b, 71c, and 71d for forming different color images are arranged in parallel to each other in a direction in which an intermediate transfer belt 28 extends. Respective color images formed by the image forming units 71a, 71b, 71c, and 71d are transferred onto the intermediate transfer belt 28 sequentially. It is to be noted that although an electrophotographic image forming configuration is shown in FIG. 1, alternatively, inkjet image recording mechanism can be used instead.

The tandem image forming unit 90 is positioned substantially at a vertical center of the image forming apparatus 1. An optical scanning device 72 serving as an optical writing device is provided above the tandem image forming unit 90, and the sheet feeder 4 including the sheet tray 40 for containing sheets of recording media such as transfer sheet is provided beneath the tandem image forming unit 90.

Each image forming unit 71 includes a photoreceptor drum 22 capable of rotating clockwise in FIG. 1 and a charging roller 21 provided around the photoreceptor drum 22 to charge the photoreceptor drum 22. The charging roller 21 may be disposed in contact with the photoreceptor drum 22. The image forming unit 71 further includes a development device 31 and a cleaning device 23. The development device 31 includes a development roller 32 to develop with toner an electrostatic latent image formed on the photoreceptor drum 22. The cleaning device 23 includes a blade disposed in contact with the photoreceptor drum 22 to remove toner therefrom after image transfer. These components are housed in a photoreceptor unit 20.

In each photoreceptor unit 20, the charging roller 21 charges the photoreceptor drum 22 to a high electrical potential uniformly, thereby initializing it. Then, the optical scanning device 72 scans the photoreceptor drum 22 with a laser beam 36 (i.e., exposure light) selectively according to image data. Thus, an electrostatic latent image is formed with portions where the electrical potential is decayed by the exposure light and the portions having the high electrical potential due to the initialization.

The development device 31 supplies toner to the low potential portions (or high potential portions) of the electrostatic latent image, developing the electrostatic latent image into a toner image (development process). As the photoreceptor drum 22 rotates clockwise in FIG. 1, the toner image is transported in the circumferential direction of the photoreceptor drum 22 toward a primary-transfer position.

Formation and development of latent images in the respective photoreceptor units 20 are performed sequentially. Then, cyan, magenta, yellow, and black images are transferred primarily therefrom and superimposed one on another on the intermediate transfer belt 28 rotating in the direction indicated by arrow P in FIG. 1, forming a multicolor image.

For image development, a bias voltage having a negative potential in which a direct current (DC) voltage is overlapped with an alternating current (AC) voltage is applied to a metal core of the development roller 32 from a bias power source. Additionally, a DC bias voltage having a negative potential is applied from another bias power source to the charging roller 21 to charge the photoreceptor drum 22. Further, primary-transfer rollers 29 are provided on a back side of the intermediate transfer belt 28 that contacts the photoreceptor drums 22.

The intermediate transfer belt 28 is stretched around a driving roller 26 and a driven roller 27 and rotates counterclockwise in FIG. 1. The driving roller 26 is disposed facing a secondary-transfer roller 39 via the intermediate transfer belt 28, thus forming a nip serving as a secondary-transfer position 50 therebetween. The multicolor toner image is transferred from the intermediate transfer belt 28 at the secondary-transfer position 50 onto the sheet by the secondary-transfer roller 39.

The toner image is fixed on the sheet by a fixing device 70, after which the sheet is discharged by a pair of discharge rollers 80 through a discharge path 81 to a discharge tray 5. In duplex printing (double-side printing), the sheet is transported through a reversal conveyance path 82, reversed upside down, and forwarded again to the secondary-transfer position 50.

The reversal conveyance path 82 diverges from the discharge path 81, detours to a side of the tandem image forming unit 90, and converges into a conveyance path upstream from a pair of registration rollers 61. Accordingly, similarly to the sheets fed from the sheet tray 40, the sheet reversed through the reversal conveyance path 82 is transported toward the registration rollers 61 and set at a registration position.

The sheet tray 40 of the sheet feeder 4 includes a handle 93 with which users can insert into and drawn out the sheet tray 40 from the apparatus body 1A in a lateral direction in FIG. 1. The sheet tray 40 includes a loading board that is pushed by a bias member. Sheets can be sent out from the sheet tray 40 of the sheet feeder 4 by a feed roller 41, and a friction pad 42 separates one from the sheets. The presence of sheets on the sheet tray 40 is detected by a sheet detector 43. Further, a registration detector 60 is provided for setting a registration timing of the sheet fed from the sheet tray 40 or a bypass feeding path 44. Components relating to sheet feeding further include the registration rollers 61 to forward the sheet to the secondary-transfer position 50 in accordance with the registration timing, the reversal conveyance path 82 for duplex printing, and a member to switch the route of the sheet for duplex printing.

In the present embodiment, the feed roller 41, the registration detector 60, and the registration rollers 61 are provided to the apparatus body 1A. The friction pad 42 and the bypass feeding path 44 are provided to the sheet tray 40 that is removably inserted into the apparatus body 1A. With this configuration, the sheet tray 40 can slide without interfering with the apparatus body 1A.

The pair of slide rails 300 is provided between the sheet tray 40 and the apparatus body 1A. Each slide rail 300 includes an outer rail 100 and an inner rail 200 slidable inside the outer rail 100. The outer rail 100 is provided to the apparatus body 1A, and the inner rail 200 is provided to the sheet tray 40. Then, the sheet tray 40 is mounted thereon so that the sheet tray 40 can be pulled out from to the apparatus body 1A.

Additionally, a small-diameter roller 110 is attached to the outer rail 100, and a large-diameter roller 210 is attached to the inner rail 200. The outer rail 100 and the inner rail 200 are assembled together with the small-diameter roller 110 held in the inner rail 200 and the large-diameter roller 210 held in the outer rail 100. With this configuration, the sheet tray 40 can slide between a retracted position (i.e., a sheet feeding position) inside the apparatus body 1A to feed sheets thereto and a drawn-out position indicated by broken lines in FIG. 1, at which sheets are supplied to the sheet tray 40.

Figure 2A:
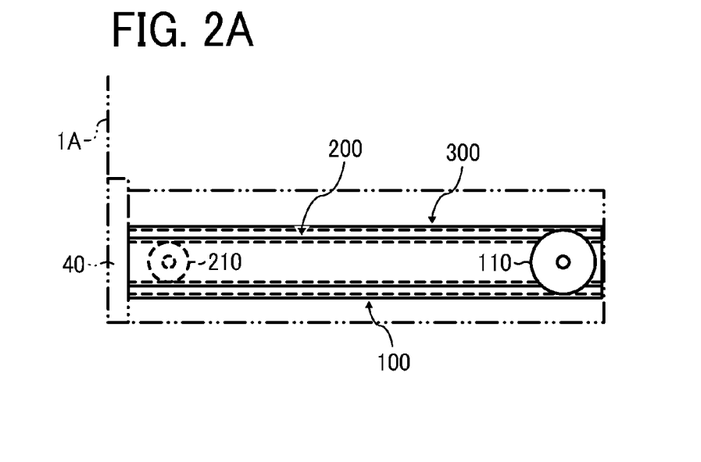
FIG. 2A illustrates a state in which a sheet tray according to an embodiment is mounted in an apparatus body and at a retracted position.
Figure 2B:
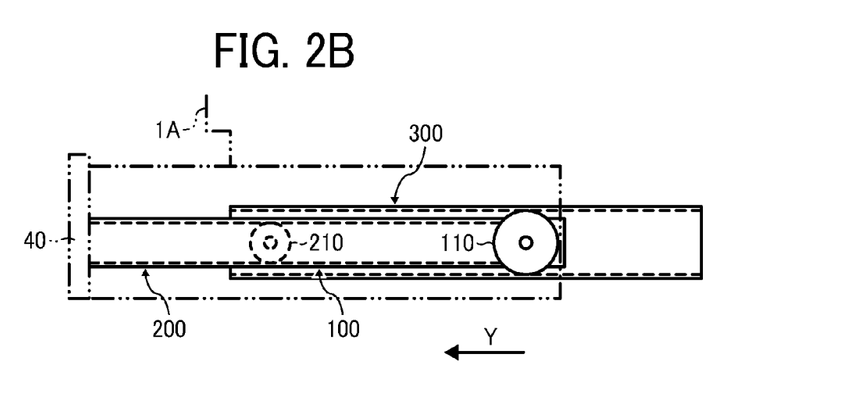
FIG. 2B illustrates a state in which the sheet tray is drawn out to a certain extent.
Figure 2C:
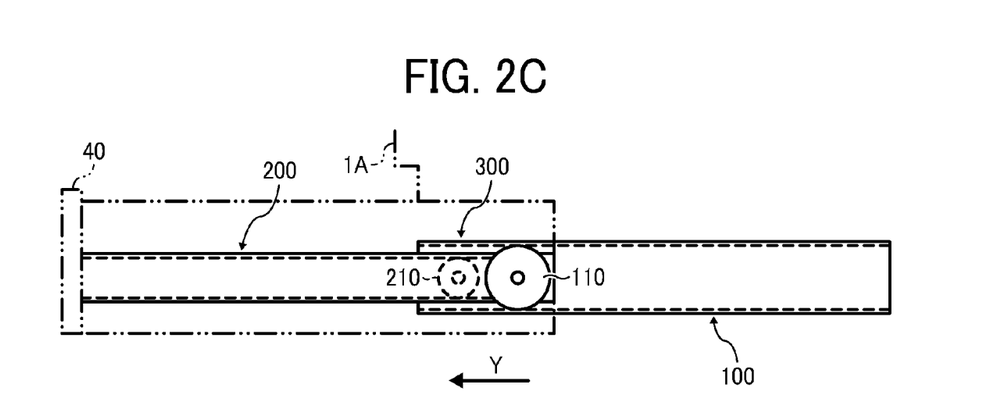
FIG. 2C illustrates a state in which the sheet tray is fully drawn out from the apparatus body and at a drawn-out position.

The slide rail 300 according to the present embodiment is described in further detail. FIGS. 2A, 2B, and 2C illustrate a configuration and movement of the sheet tray 40. FIG. 2A illustrates a state in which the sheet tray 40 is mounted inside the apparatus body 1A, that is, at the sheet feeding position. In FIG. 2B, the sheet tray 40 is drawn out from the apparatus body 1A in the direction indicated by arrow Y (hereinafter "pulling out direction Y") and midway to the drawn-out position, and FIG. 2C illustrates the sheet tray 40 being at the drawn-out position. As described above, the inner rail 200 is provided inside the outer rail 100 slidably, thus forming the slide rail 300.

Figure 3:
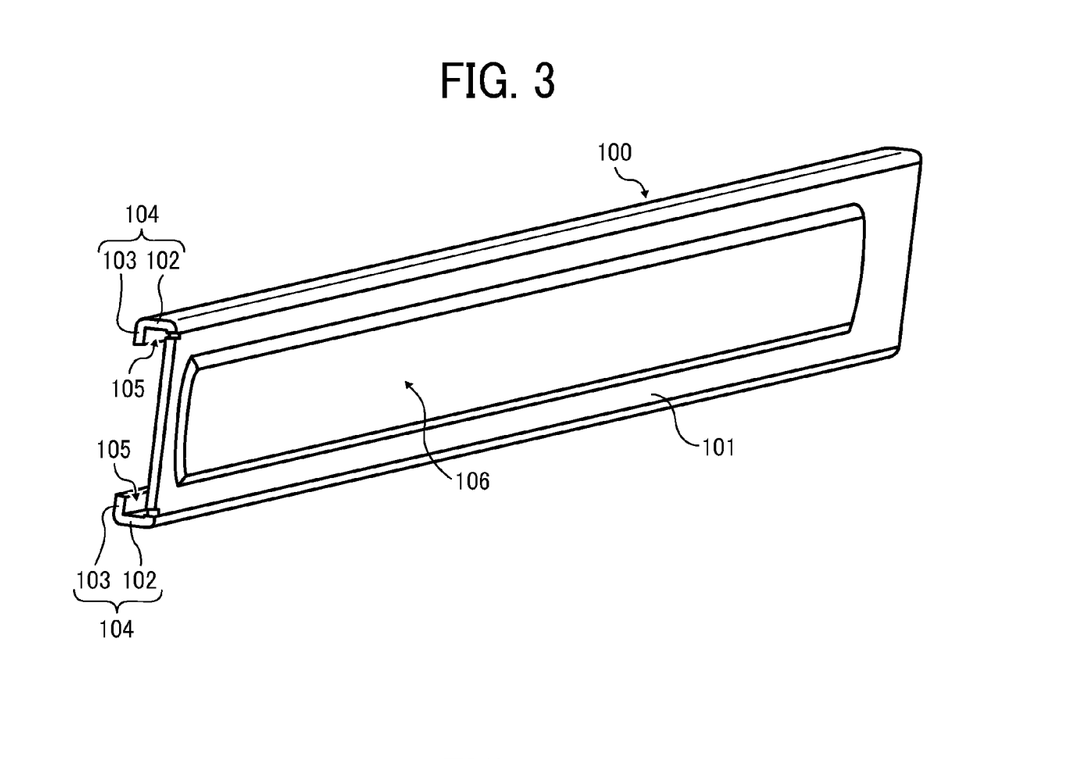
FIG. 3 is a perspective view illustrating an outer rail of a slide rail incorporated in the image forming apparatus shown in FIG. 1.
Figure 4:
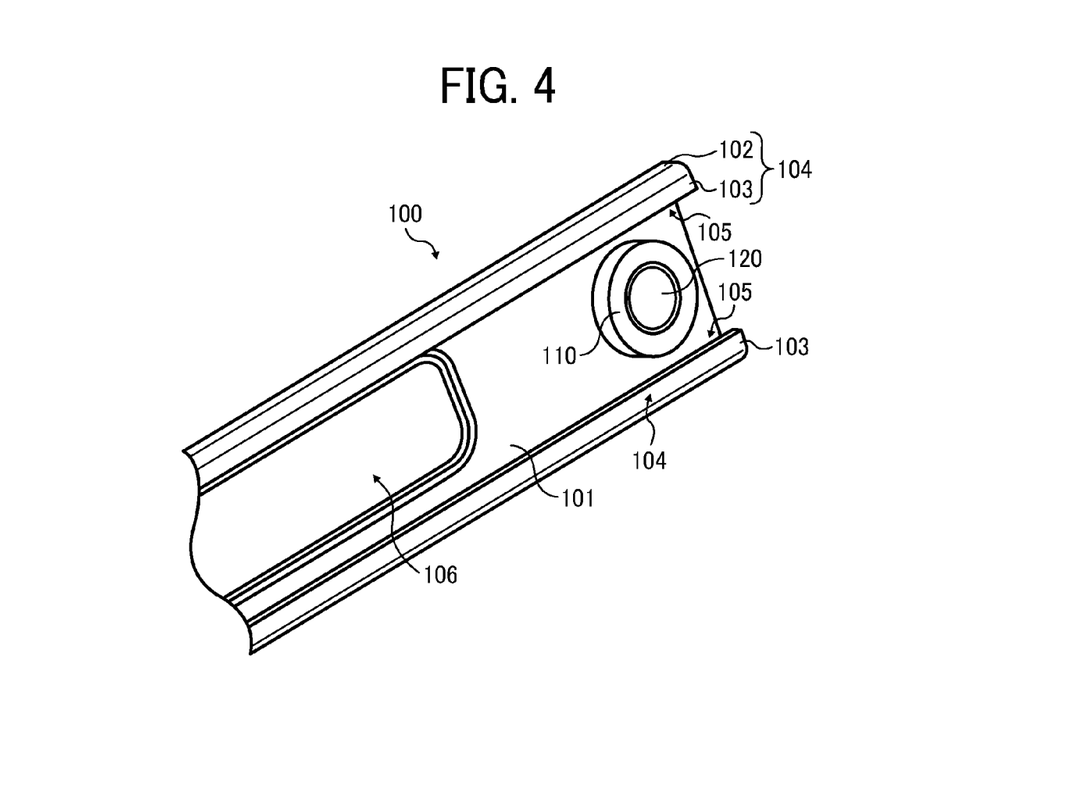
FIG. 4 is a perspective view illustrating the outer rail and a small-diameter roller.
Figure 5:
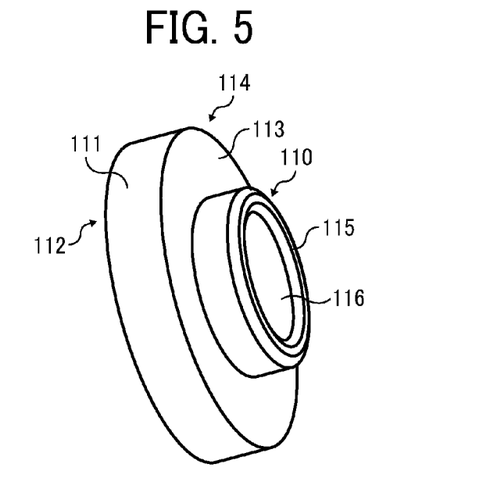
FIG. 5 is a perspective view illustrating the small-diameter roller.

Next, the outer rail 100 is described below. FIG. 3 is a perspective view illustrating the outer rail 100 of the slide rail 300 according to the first embodiment. FIG. 4 is a perspective view illustrating the outer rail 100 and the small-diameter roller 110. FIG. 5 is a perspective view illustrating the small-diameter roller 110.

The outer rail 100 can be constructed of stainless steel, for example. As shown in FIG. 3, the outer rail 100 includes a first rail board 101 that is long in the lateral direction in FIG. 3, and a pair of rims 104 project from long sides of the first rail board 101 to the left in FIG. 3. Each rim 104 is shaped like a character "L" and constructed of a base portion 102 (or standing portion) connected to the long side of the first rail board 101 and a folded-back wall 103 folded inside from an end of the base portion 102. With this configuration, a pair of grooves 105 is formed inside the rims 104, defined by the rims 104 and the first rail board 101. Opening sides of the grooves 105 face each other.

The first rail board 101 further include a projecting portion 106 projecting from a face of the first rail board 101 outward to a side (on the right in FIG. 3) opposite the rim 104. The projecting portion 106 extends in a longitudinal direction of the first rail board 101. The projecting portion 106 can be processed through drawing. The strength of the outer rail 100 can be enhanced with the projecting portion 106. Additionally, this configuration can reduce a contact area between the large-diameter roller 210 and the first rail board 101, thereby reducing resistance against the first rail board 101 due to rolling and movement of the large-diameter roller 210. Accordingly, smooth movement of the slide rail 300 can be secured.

Further, as shown in FIG. 4, the small-diameter roller 110 is provided to a longitudinal end portion of the first rail board 101 of the outer rail 100 and attached thereto rotatably around a first shaft 120.

Referring to FIG. 5, the small-diameter roller 110 includes a roller member 114 and a cylindrical member 115, and a shaft hole 116 is formed in the small-diameter roller 110. The roller member 114 has a circumferential surface 111 and opposing side faces 112 and 113, and the cylindrical member 115 is positioned to disengage the side face 113 of the roller member 114 from the first rail board 101. The first shaft 120 is inserted into the shaft hole 116 to penetrate it, and the small-diameter roller 110 is attached to the first rail board 101 rotatably. At that time, a clearance for receiving a folded-back wall 203 of the inner rail 200 can be secured between the side face 113 of the roller member 114 and the first rail board 101.

Figure 6:
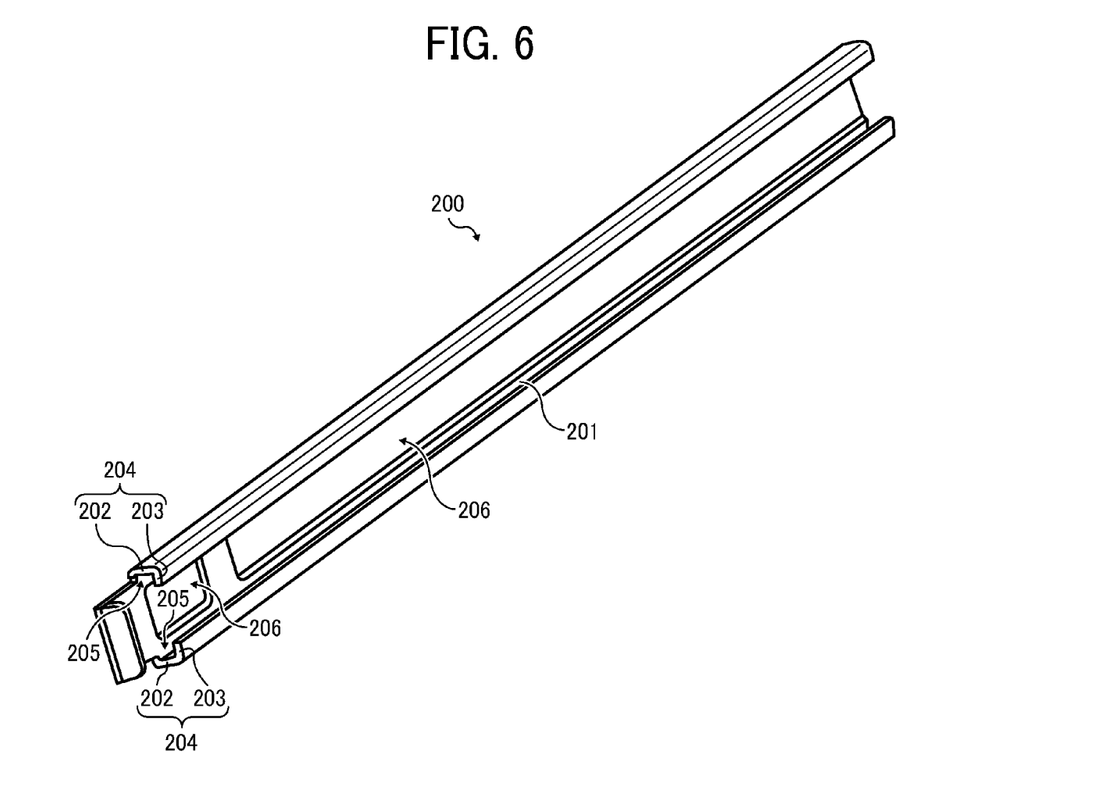
FIG. 6 is a perspective view illustrating an inner rail.
Figure 7:
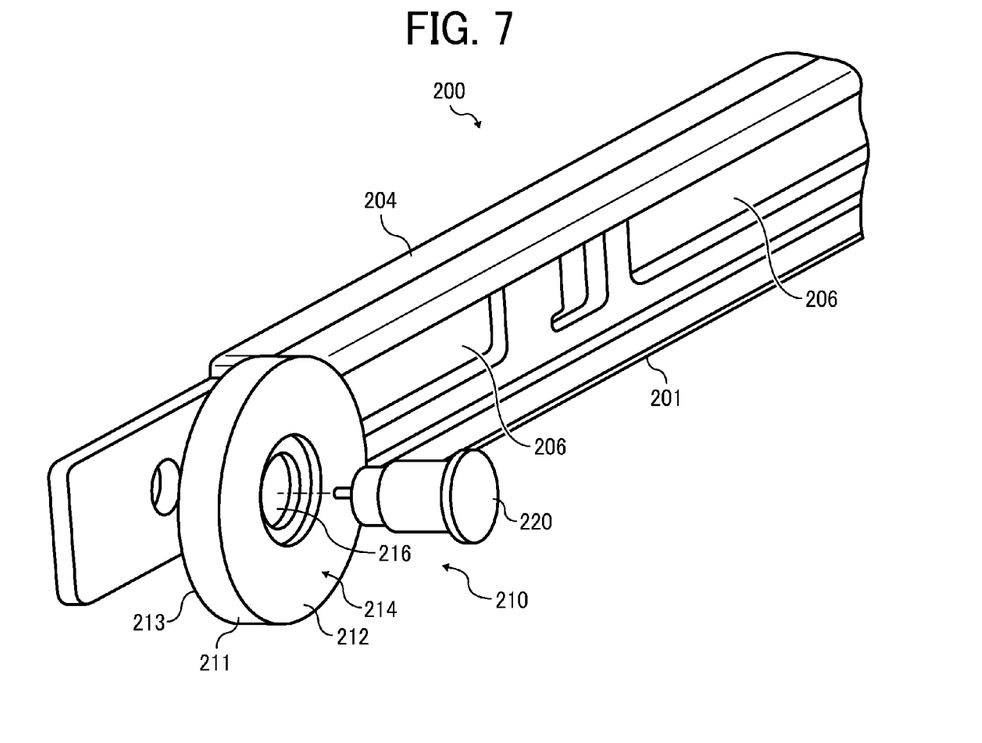
FIG. 7 is an exploded perspective view illustrating the inner rail and a large-diameter roller.
Figure 8:
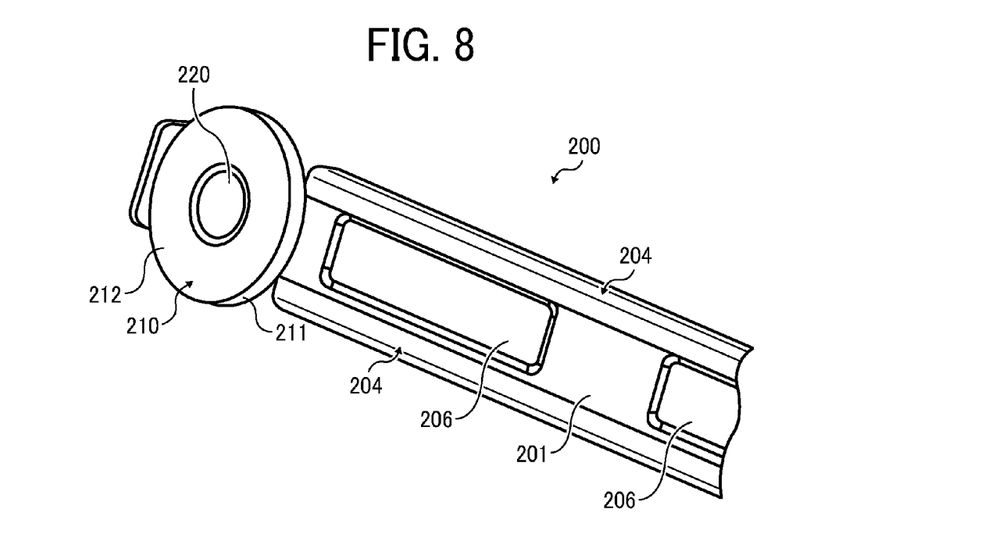
FIG. 8 is a perspective view illustrating the inner rail to which the large-diameter roller is attached.

The inner rail 200 is described in further detail below. FIG. 6 is a perspective view illustrating the inner rail 200 according to the first embodiment. FIG. 7 is an exploded perspective view illustrating the inner rail 200 and the large-diameter roller 210. FIG. 8 is a perspective view illustrating the inner rail 200 to which the large-diameter roller 210 is attached.

The inner rail 200 can be constructed of stainless steel, for example. As shown in FIG. 6, the inner rail 200 includes a second rail board 201 that is long in the lateral direction in FIG. 6, and a pair of rims 204 project from long sides of the second rail board 201 to the right in FIG. 6. The inner rail 200 has a longitudinal length identical or similar to that of the outer rail 100. A width, which is a length in a direction perpendicular to the longitudinal direction, of the second rail board 201 of the inner rail 200 is shorter than that of the first rail board 101 of the outer rail 100 so that the inner rail 200 can be inserted between the rims 104 of the outer rail 100.

Each rim 204 is shaped like a character "L" and constructed of a base portion 202 (or standing portion) connected to the long side of the second rail board 201 and a folded-back wall 203 folded inside from an end of the base portion 202. With this configuration, a pair of grooves 205 is formed inside the respective rims 205, defined by the rims 204 and the second rail board 201. Opening sides of the grooves 205 face each other.

As shown in FIGS. 6, 7, and 8, the second rail board 201 further include multiple projecting portions 206 projecting from a face of the second rail board 201 outward to a side (on the left or distal side in FIGS. 6 and 7) opposite the rims 204. The multiple projecting portions 206 are arranged in a longitudinal direction of the second rail board 201. The projecting portion 206 can be processed through drawing. The strength of the inner rail 200 can be enhanced with the projecting portion 206. Additionally, this configuration can reduce a contact area between the small-diameter roller 110 and the second rail board 201, thereby reducing resistance against the second rail board 201 due to rolling and movement of the small-diameter roller 110. Accordingly, smooth movement of the slide rail 300 can be secured.

The large-diameter roller 210 includes a roller member 214, having a circumferential surface 211 and opposing side faces 212 and 213, and a cylindrical member 215. A shaft hole 216 is formed in the large-diameter roller 210. Although not shown in the drawings, a cylindrical member is provided to the large-diameter roller 210 to disengage the roller member 214 from the second rail board 201. A second shaft 220 is inserted into the shaft hole 216 to penetrate it, and the large-diameter roller 210 is attached to the second rail board 201 rotatably.

Next, relative locations and sizes of the small-diameter roller 110, the large-diameter roller 210, the outer rail 100, and the inner rail 200 are described below.

In the slide rail 300 according to the first embodiment, the small-diameter roller 110 is positioned on a leading side (on the left in FIGS. 2A to 2C) of the outer rail 100 in the pulling out direction Y in which the inner rail 200 held between the grooves 105 is pulled out from the outer rail 100. The large-diameter roller 210 is positioned on a leading side (on the right in FIGS. 2A to 2C) of the inner rail 200 in the direction in which the inner rail 200 is inserted into the grooves 105 of the outer rail 100 and opposite the pulling out direction Y.

Figure 9:
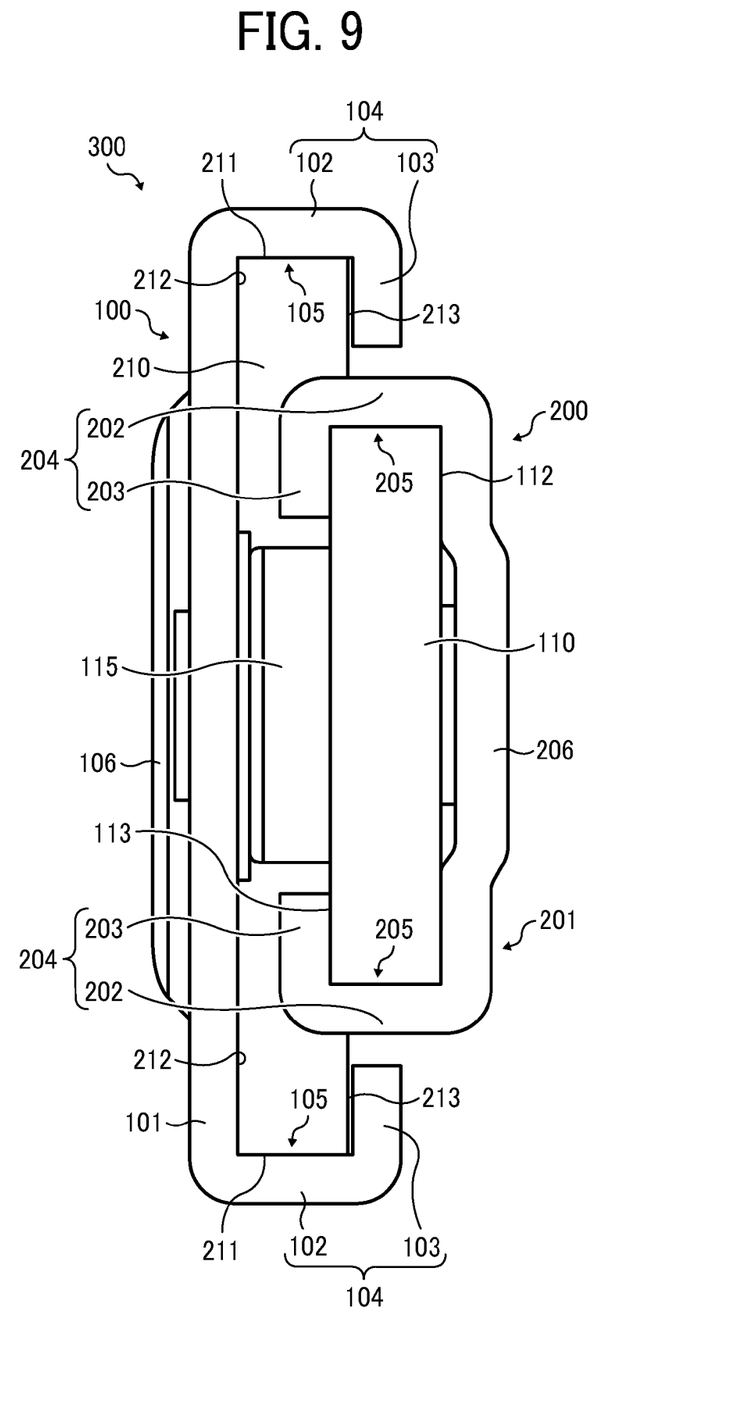
FIG. 9 is an end elevation view illustrating the outer rail and the inner rail according to the first embodiment, assembled together.

As shown in FIGS. 2A and 9, the small-diameter roller 110 is held inside the grooves 205 of the inner rail 200. With this configuration, the load can be supported by the base portion 202 on the lower side from the circumferential surface 111 of the roller member 114 of the small-diameter roller 110. As the sheet tray 40 moves, the small-diameter roller 110 rolls with its upper side or lower side held inside the grooves 205, thus alleviating resistance against movement of the sheet tray 40.

Therefore, the small-diameter roller 110 is designed to have an outer diameter suitable for rotating freely inside the groove 205 in a state in which the load is applied thereto.

When the small-diameter roller 110 is mounted inside the grooves 205 of the inner rail 200, the second rail board 201 of the inner rail 200 contacts the side face 112 of the small-diameter roller 110, and the folded-back walls 203 of the inner rail 200 contact the side face 113. Accordingly, even when the slide rail 300 receives a lateral load, the small-diameter roller 110 can be kept inside the grooves 205 reliably and prevented from being disengaged therefrom. Additionally, owing to the projecting portion 206, the inner rail 200 can have a high degree of rigidity and does not deform easily.

Additionally, with the projecting portion 206, the contact area between the second rail board 201 and the side face 112 of the small-diameter roller 110 can be reduced, thereby reducing frictional resistance against the second rail board 201 caused by the movement of the small-diameter roller 110. Accordingly, smooth movement of the slide rail 300 can be secured better.

As shown in FIGS. 2A and 9, the large-diameter roller 210 is mounted inside the grooves 105 of the outer rail 100. With this configuration, the load can be supported by the base portion 102 on the lower side from the circumferential surface 211 of the roller member 214 of the large-diameter roller 210. As the sheet tray 40 moves, the large-diameter roller 210 rolls, thus alleviating resistance against the movement of the sheet tray 40.

Therefore, the large-diameter roller 210 is designed to have an outer diameter suitable to rotate freely inside the grooves 105 in a state in which the load is applied thereto.

When the large-diameter roller 210 is mounted inside the grooves 105 of the outer rail 100, the first rail board 101 of the outer rail 100 contacts the side face 212 of the large-diameter roller 210, and the folded-back walls 103 of the outer rail 100 contact the side face 213. Accordingly, even when the slide rail 300 receives a lateral load, the large-diameter roller 210 can be kept inside the grooves 105 reliably and prevented from being disengaged therefrom. Additionally, owing to the projecting portion 106, the outer rail 100 can have a high degree of rigidity and does not deform easily.

Additionally, with the projecting portion 106, the contact area between the first rail board 101 and the side face 212 of the large-diameter roller 210 can be reduced, thereby reducing frictional resistance against the small-diameter roller 110 caused by the movement of the large-diameter roller 210. Accordingly, smooth movement of the slide rail 300 can be secured better.

As shown in FIGS. 2B and 2C, as the sheet tray 40 to which the slide rail 300 is provided is drawn out from the apparatus body 1A as indicated by arrow Y, the inner rail 200 is drawn out from the outer rail 100. At that time, the large-diameter roller 210 is drawn out together with the inner rail 200. The large-diameter roller 210 rotates, being held inside the grooves 105 of the outer rail 100, thereby guiding the inner rail 200. Simultaneously, the large-diameter roller 210 guides the outer rail 100 by rotating, being held inside the grooves 105 of the outer rail 100. Thus, the sheet tray 40 can be drawn out from the apparatus body 1A smoothly.

When the sheet tray 40 is pushed into the apparatus body 1A, the outer rail 100 and the inner rail 200 can move smoothly, guided by the small-diameter roller 110 and the large-diameter roller 210.

Second Embodiment

A slide rail according to a second embodiment is described below.

In the above-described slide rail 300 according to the first embodiment, it is possible that resistive force is generated because not points but a face (the side face 213) of the large-diameter roller 210 contacts the folded-back wall 103 of the outer rail 100. The slide rail according to the second embodiment is designed to alleviate the resistive force.

Figure 10A:
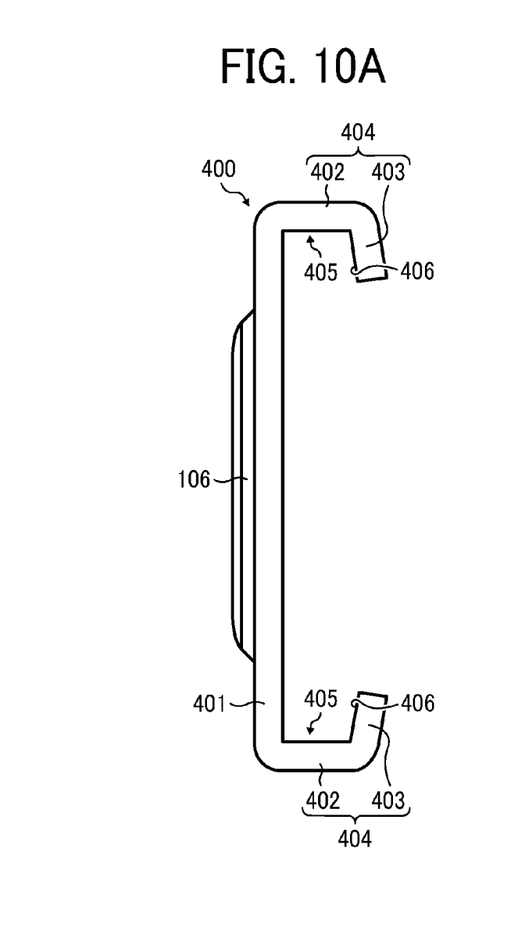
FIG. 10A is an end elevation view illustrating an outer rail of a slide rail according to a second embodiment.
Figure 10B:
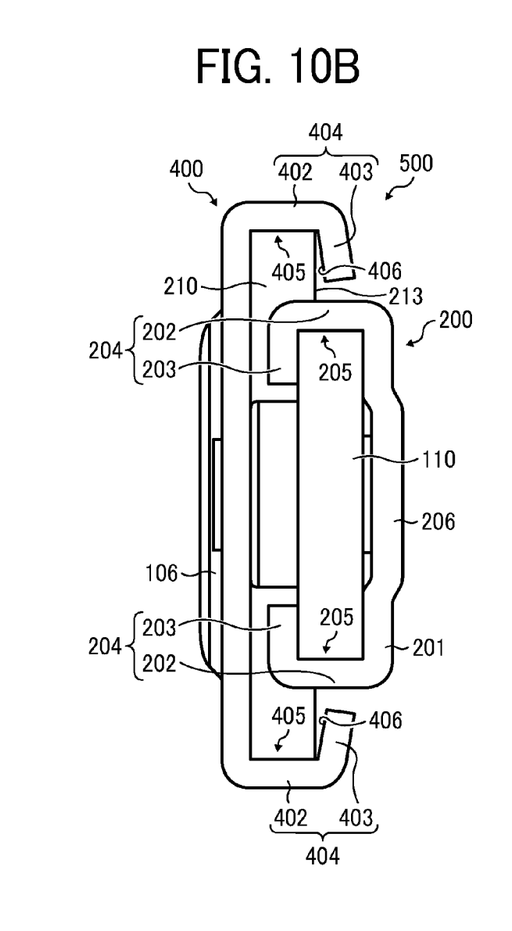
FIG. 10B is an end elevation view illustrating the outer rail shown in FIG. 10A and the inner rail mounted thereto.

FIGS. 10A and 10B illustrate a slide rail 500 according to the second embodiment. FIG. 10A is an end elevation view illustrating an outer rail 400 according to the second embodiment, and FIG. 10B is an end elevation view illustrating the outer rail 400 to which the inner rail 200 is mounted.

Similarly to the outer rail 100 according to the first embodiment, the outer rail 400 according to the second embodiment includes a first rail board 401 and a pair of rims 404. The first rail board 401 extends in the direction perpendicular to the surface of the paper on which FIGS. 10A and 10B are drawn. The second embodiment is different from the first embodiment in that a folded-back wall 403 of the rim 404 is inclined to the right in FIGS. 10A and 10B from a base end toward a free end. That is, the folded-back wall 403 is inclined in a direction away from the first rail board 401 as the position approaches to a center in the width direction of the first rail board 401. With this configuration, an inner face 406 of the folded-back wall 403 defining a groove 405 on the side of the inner rail 200 is inclined away from the outer rail 400 as the position in the width direction approaches to an open side (i.e., the center in the width direction). In FIGS. 10A and 10B, reference numbers 402 represents a base portion of the folded-back wall 403, and the first rail board 401 includes a projecting portion 106 similarly to the first rail board 101 in the first embodiment.

As shown in FIG. 10B, the inner rail 200 according to the first embodiment is mounted to the outer rail 400 according to the second embodiment, together forming the slide rail 500. According to the second embodiment, the contact area between the side face 213 of the large-diameter roller 210 and the folded-back wall 403 of the outer rail 400 can be reduced, and the contact area can be linear not a face. Accordingly, resistance against movement of the large-diameter roller 210 can be reduced.

It is to be noted that, although the description above concerns the inclined folded-back wall 403 of the outer rail 400, alternatively or additionally, the folded-back wall 203 of the inner rail 200 can be inclined to reduce resistance against movement of the small-diameter roller 110.

Third Embodiment

Figure 11A:
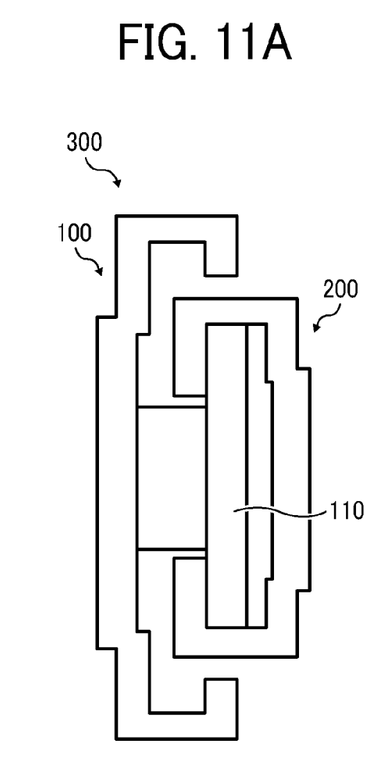
FIG. 11A is an end elevation view illustrating a state in which the inner rail parallels the outer rail.
Figure 11B:
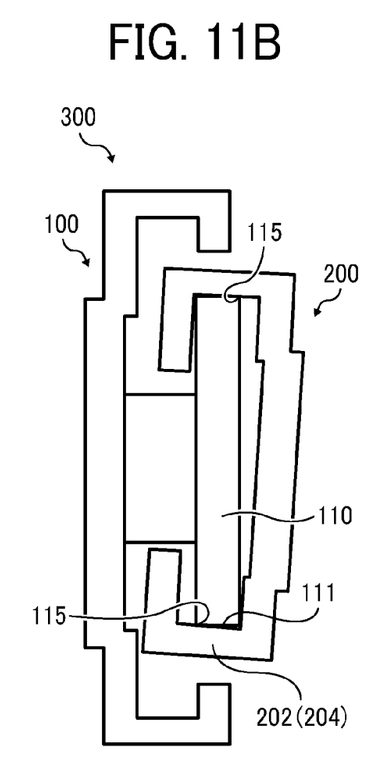
FIG. 11B is an end elevation view illustrating a state in which the inner rail receives load and is inclined relative to the outer rail.

A slide rail according to a third embodiment is described below. FIG. 11A is an end elevation view illustrating a state in which the inner rail 200 parallels the outer rail 100, and FIG. 11B is an end elevation view illustrating a state in which the inner rail 200 is oblique to the outer rail 100.

In the above described embodiments, for example, in the slide rail 300 according to the first embodiment, it is assumed that the outer rail 100 and the inner rail 200 are disposed parallel to each other as shown in FIG. 11A. In practice, however, it is possible that the inner rail 200 is inclined relative to the outer rail 100 depending on various factors such as the relative positions among the large-diameter roller 210, the small-diameter roller 110, and the grooves 105 and 205 as shown in FIG. 11B.

If the slide rail 300 is used in this state, it is possible that the inclination of the inner rail 200 inhibits the circumferential surface 111 of the small-diameter roller 110 from fully contacting an inner face of the base portion 202 of the inner rail 200 (that defines the groove 205 shown in FIG. 6), allowing only a linear portion (circumferential edge) of the small-diameter roller 110 to contact the inner face of the based portion 202. In such a state, stress can be concentrated at the linear contact position of the small-diameter roller 110, and the small-diameter roller 110 can be damaged. In view of the foregoing, the shape of the small-diameter roller, the shape of the large-diameter roller, or both can be changed from those in the above-described embodiments to prevent damage thereto.

Figure 12:
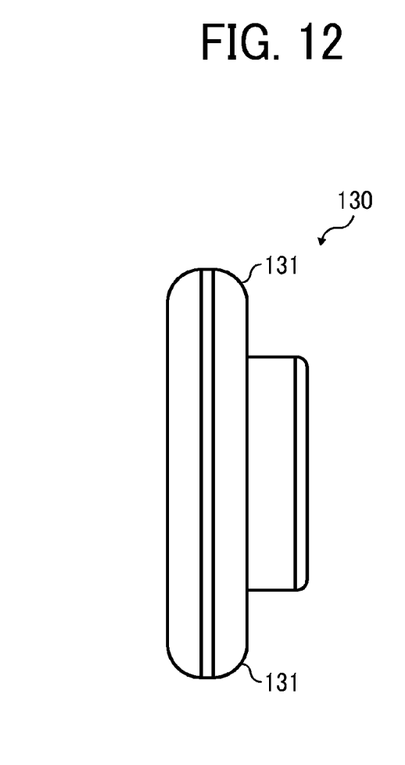
FIG. 12 is a front view of a small-diameter roller according to a third embodiment.

FIG. 12 is a front view of a small-diameter roller 130 according to the third embodiment. The small-diameter roller 130 according to the third embodiment is chamfered, and a circumferential surface 131 thereof is curved. In particular, the circumferential surface 131 thereof is a continuous curve or an arc in cross section. Owing to the curved circumferential surface 131 of the small-diameter roller 130, even when the inner rail 200 is inclined relative to the outer rail 100, concentration of stress to the small-diameter roller 130 can be prevented. Thus, damage to the small-diameter roller 130 can be prevented or alleviated.

Similarly, when the large-diameter roller 210 is chamfered and the circumferential surface 211 is shaped into a continuous curve in cross section, damage to the large-diameter roller 210 resulting from concentration of stress can be prevented or alleviated. It is to be noted that the shape of the circumferential surface is not limited to arcs but can be other types of curve.

According to the above-described embodiments, slide rails employing rollers can be stronger against lateral load and move smoothly. Additionally, the slide rail can be assembled and processed easily with a reduced cost. Additionally, compactness of the slide rail can be maintained.

Numerous additional modifications and variations are possible in light of the above teachings. It is therefore to be understood that, within the scope of the appended claims, the disclosure of this patent specification may be practiced otherwise than as specifically described herein.

What is claimed is:

1. A slide rail comprising:
    an outer rail including a first rail board and a pair of rims projecting from long sides of the first rail board, forming a pair of first grooves positioned on an inner side of the first rail board with opening sides of the first grooves facing each other;
    an inner rail inserted between the first grooves of the first rail board to be drawn out from the first rail board, the inner rail including:
        a second rail board shorter than the first rail board in a width direction perpendicular to the long side thereof, and
        a pair of rims projecting from long sides of the second rail board, forming a pair of second grooves positioned on an inner side of the second rail board with opening sides of the second grooves facing each other;
    a large-diameter roller held between the first grooves of the outer rail, and attached to a leading side of the second rail board in a direction in which the inner rail is inserted into the first grooves of the outer rail; and
    a small-diameter roller held between the second grooves of the inner rail, and attached to a leading side of the first rail board in a direction in which the inner rail is drawn out from the first grooves of the outer rail,
    wherein the first rail board includes a protruding portion extending along the long side thereof and protruding to an outer side opposite the inner side of the first rail board on which the large-diameter roller is disposed, and
    the second rail board includes a protruding portion extending along the long side thereof and protruding to an outer side opposite the inner side of the second rail board on which the small-diameter roller is disposed.

2. The slide rail according to claim 1, wherein at least one of the protruding portion of the outer rail and the protruding portion of the inner rail is formed through drawing.

3. The slide rail according to claim 1, further comprising a first shaft provided to the first rail board, and a second shaft provided to the second rail board,
    wherein the small-diameter roller is rotatably attached to the first shaft, and the large-diameter roller is rotatably attached to the second shaft.

4. The slide rail according to claim 1, wherein the rim of the outer rail forming the first groove includes a base portion connected to the long side of the first rail board and a folded-back wall on a side of the inner rail,
    the folded-back wall of the rim of the outer rail is inclined in a direction away from the first rail board as a position approaches to a center in the width direction of the outer rail.

5. The slide rail according to claim 1, wherein the rim of the second rail forming the second groove includes a base portion connected to the long side of the second rail board and a folded-back wall on a side of the outer rail,
    the folded-back wall of the rim of the inner rail is inclined in a direction away from the second rail board as a position approaches to a center in the width direction of the inner rail.

6. The slide rail according to claim 1, wherein at least one of the large-diameter roller and the small-diameter roller has a circumferential surface curved in cross section.

7. A sheet feeder comprising:
    a sheet tray for containing sheets of recording media; and
    a slide rail to which the sheet tray is mounted slidably between a retracted position and a drawn-out position,
    the slide rail comprising:
    an outer rail including a first rail board and a pair of rims projecting from long sides of the first rail board, forming a pair of first grooves positioned on an inner side of the first rail board with opening sides of the first grooves facing each other;

an inner rail inserted between the first grooves of the first rail board to be drawn out from the first rail board, the inner rail including:
- a second rail board shorter than the first rail board in a width direction perpendicular to the long side thereof, and
- a pair of rims projecting from long sides of the second rail board, forming a pair of second grooves positioned on an inner side of the second rail board with opening sides of the second grooves facing each other;

a large-diameter roller held between the first grooves of the outer rail, and attached to a leading side of the second rail board in a direction in which the inner rail is inserted into the first grooves of the outer rail; and a small-diameter roller held between the second grooves of the inner rail, and attached to a leading side of the first rail board in a direction in which the inner rail is drawn out from the first grooves of the outer rail, wherein the first rail board includes a protruding portion extending along the long side thereof and protruding to an outer side opposite the inner side of the first rail board on which the large-diameter roller is disposed, and the second rail board includes a protruding portion extending along the long side thereof and protruding to an outer side opposite the inner side of the second rail board on which the small-diameter roller is disposed.

8. An image forming apparatus comprising:

an image forming unit for forming images on sheets of recording media; and a sheet feeder including a sheet tray for containing sheets of recording media fed to the image forming unit and a slide rail to which the sheet tray is mounted slidably between a retracted position and a drawn-out position, the slide rail comprising:

an outer rail including a first rail board and a pair of rims projecting from long sides of the first rail board, forming a pair of first grooves positioned on an inner side of the first rail board with opening sides of the first grooves facing each other;

an inner rail inserted between the first grooves of the first rail board to be drawn out from the first rail board, the inner rail including:
- a second rail board shorter than the first rail board in a width direction perpendicular to the long side thereof, and
- a pair of rims projecting from long sides of the second rail board, forming a pair of second grooves positioned on an inner side of the second rail board with opening sides of the second grooves facing each other;

a large-diameter roller held between the first grooves of the outer rail, and attached to a leading side of the second rail board in a direction in which the inner rail is inserted into the first grooves of the outer rail; and a small-diameter roller held between the second grooves of the inner rail, and attached to a leading side of the first rail board in a direction in which the inner rail is drawn out from the first grooves of the outer rail, wherein the first rail board includes a protruding portion extending along the long side thereof and protruding to an outer side opposite the inner side of the first rail board on which the large-diameter roller is disposed, and the second rail board includes a protruding portion extending along the long side thereof and protruding to an outer side opposite the inner side of the second rail board on which the small-diameter roller is disposed.

* * * * *